(12) United States Patent
Yang et al.

(10) Patent No.: US 8,369,715 B2
(45) Date of Patent: Feb. 5, 2013

(54) METHOD AND DEVICE AND COMMUNICATION SYSTEM FOR MEASURING OPTICAL POWER

(75) Inventors: Sulin Yang, Shenzhen (CN); Jinrong Yin, Shenzhen (CN); Zhiguang Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

(21) Appl. No.: 12/777,082

(22) Filed: May 10, 2010

(65) Prior Publication Data

US 2010/0221000 A1 Sep. 2, 2010

Related U.S. Application Data

(63) Continuation of application No. PCT/CN2008/073178, filed on Nov. 24, 2008.

(30) Foreign Application Priority Data

Nov. 24, 2007 (CN) .......................... 2007 1 0077418
Sep. 4, 2008 (CN) .......................... 2008 1 0215052

(51) Int. Cl.
   *H04B 10/00* (2006.01)
(52) U.S. Cl. ........................... 398/209; 398/210; 398/38
(58) Field of Classification Search .......... 398/202–214, 398/38
   See application file for complete search history.

(56) References Cited

U.S. PATENT DOCUMENTS

| | | | | |
|---|---|---|---|---|
| 5,818,620 A | * | 10/1998 | Akimoto et al. | 398/209 |
| 5,822,104 A | * | 10/1998 | Saito | 398/202 |
| 6,671,074 B2 | * | 12/2003 | Akashi | 398/202 |
| 7,196,310 B2 | * | 3/2007 | Nakamoto et al. | 250/214 A |
| 7,495,203 B2 | * | 2/2009 | Kaku et al. | 250/214 A |
| 7,676,152 B2 | * | 3/2010 | Yamabana et al. | 398/38 |
| 7,709,778 B2 | * | 5/2010 | Teeter et al. | 250/214 R |
| 7,720,394 B2 | * | 5/2010 | Nakamoto et al. | 398/208 |
| 7,764,886 B2 | * | 7/2010 | Dalton et al. | 398/208 |
| 7,865,088 B2 | * | 1/2011 | Dalton | 398/210 |
| 2005/0111843 A1 | | 5/2005 | Takeuchi et al. | |
| 2007/0023615 A1 | * | 2/2007 | Ruegg et al. | 250/214 R |
| 2008/0002973 A1 | * | 1/2008 | Yamabana et al. | 398/38 |

FOREIGN PATENT DOCUMENTS

| | | |
|---|---|---|
| CN | 1612506 A | 5/2005 |
| CN | 1905431 A | 1/2007 |
| CN | 101179332 A | 5/2008 |
| WO | WO 2007/010518 A1 | 1/2007 |

OTHER PUBLICATIONS

Y.P. Machekhin, et al., "New Precise Optical Powermeter," Kharkiv State Scientific & Research Institute of Metrology, LFNM'2001, May 22-24, 2001, Kharkiv, Ukraine, pp. 159-161.

Written Opinion of the International Searching Authority dated Mar. 5, 2009 in connection with International Patent Application No. PCT/CN2008/073178.

International Search Report issued Mar. 5, 2009 in connection with International Patent Application No. PCT/CN2008/073178.

* cited by examiner

*Primary Examiner* — Agustin Bello (57) ABSTRACT

A method for measuring an optical power includes: acquiring code type information in an optical signal of a communication system, in which the optical signal includes an optical signal of burst emission and/or an optical signal of burst reception; measuring the optical signal of the communication system, and acquiring an optical power value of the optical signal; and correcting the optical power value according to the code type information.

4 Claims, 4 Drawing Sheets

METHOD AND DEVICE AND COMMUNICATION SYSTEM FOR MEASURING OPTICAL POWER

CROSS-REFERENCE TO RELATED APPLICATIONS

This application is a continuation of International Application No. PCT/CN2008/073178, filed on Nov. 24, 2008, which claims priority to Chinese Patent Application No. 200810215052.5, filed on Sep. 4, 2008 and Chinese Patent Application No. 200710077418.2, filed on Nov. 24, 2007, all of which are hereby incorporated by reference in their entireties.

TECHNICAL FIELD

The present invention relates to the field of optical fiber access, and more particularly to a method and a device for measuring an optical power.

BACKGROUND

Figure 1:
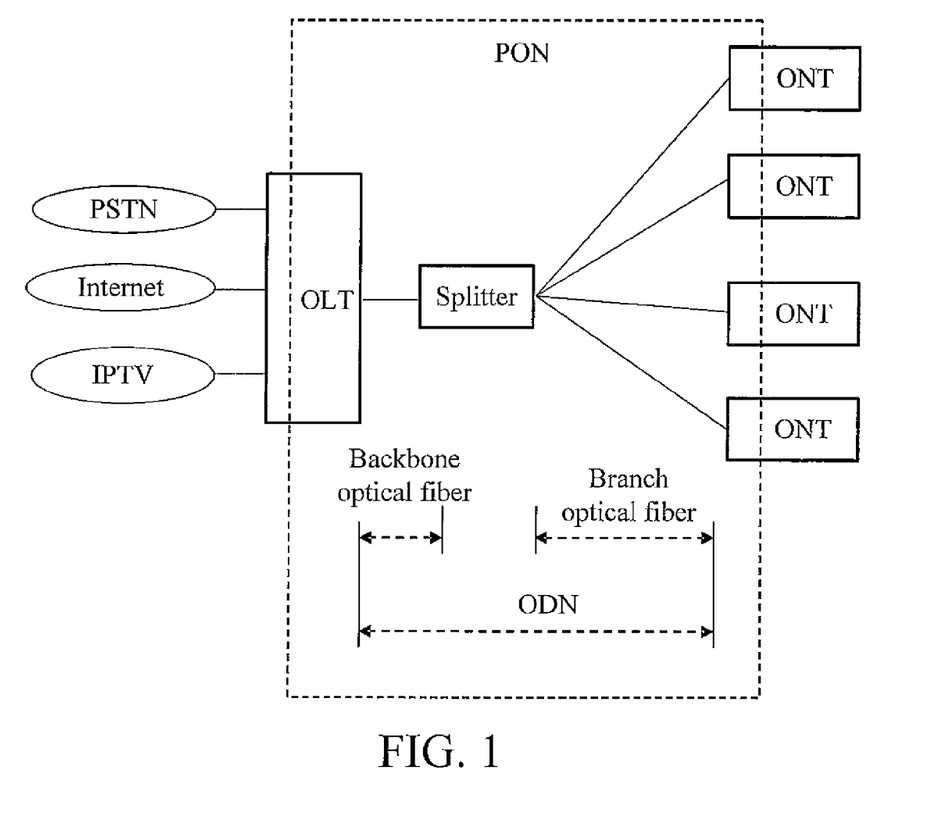
FIG. 1 is a schematic structural view of a PON system.

The passive optical network (PON) technology is a point-to-multipoint optical fiber access technology. As shown in FIG. 1, a PON is formed by an optical line terminal (OLT) on a station side, optical network units (ONUS) on a subscriber side, and an optical distribution network (ODN). Usually, a downlink adopts a time division multiplexing (TDM) broadcast manner, and an uplink adopts a time division multiple access (TDMA) manner. The so-called "Passive" means that the ODN does not include any active electronic device and electronic power source, and is completely formed by passive devices such as a splitter, so that the management and maintenance cost is rather low.

In an optical fiber system, usually, an optical power is adopted to indicate an intensity of an optical signal, and a unit thereof is milliwalt (mw). Meanwhile, in the optical communication, the optical signals have a small power, so that the optical power is usually indicated by dBm, in which 1 mw=0 dBm. A device for measuring an optical power is connected to a system under measurement, and is configured to amplify, sample, and perform an analogue to digital conversion on a signal to be measured. The device for measuring the optical power usually only acquires an average value of a series of data, that is, the device measures an average optical power.

A measurement result of the average optical power is an average value of intensities of optical signals corresponding to "0" signals and "1" signals within a period of time. In a PON system, the ONUs can only send uplink data in time slots allocated by the OLT in a TDMA manner, that is, send the data in a burst mode, so that the distribution of 0 and 1 in the data sent by each ONU is continuously varied each time, and thus the measured average burst transmitting optical power and/or average burst received optical power are continuously changed. Meanwhile, when the intensity of the optical signal passing through a certain segment of the optical fiber is measured, the bending or aging situation of the optical fiber in the ODN may also result in the change of the measurement result. Thus, when the measurement result is changed, it cannot determine whether the change is caused by a change of the distribution of signals under measurement or caused by the bending or aging situation of the optical fiber in the ODN, that is to say, the bending or aging problem of the optical fiber in the ODN cannot be identified through the measured optical power.

SUMMARY

The present invention is directed to a method and a device for measuring an optical power, which are applicable to solve a problem in the prior art that the bending or aging failure of an optical fiber in an ODN cannot be identified through a measured optical power.

Accordingly, the present invention provides the following technical solutions.

A method for measuring an optical power, including:

acquiring code type information in an optical signal of a communication system, where the optical signal includes an optical signal of burst emission and/or an optical signal of burst reception;

measuring the optical signal of the communication system, and acquiring an optical power value of the optical signal; and correcting the optical power value according to the code type information.

A device for measuring an optical power, including:

an acquiring module, configured to acquire code type information in an optical signal of a communication system, where the code type information is acquired by counting an electrical signal converted from an optical signal from a device at a sending end, or according to a report from the device at the sending end;

a power measurement module, configured to measure the electrical signal converted from the optical signal, so as to acquire an optical power value; and a processing module, configured to correct the optical power value according to the code type information.

A communication system, including:

a device at a sending end, configured to send a burst optical signal, collect code type information in the signal when sending the signal to a device at a receiving end, and send the collected code type information to the device at the receiving end; and a device at a receiving end, configured to receive the burst optical signal, measure the optical signal received from the device at the sending end, acquire an optical power value of the optical signal, and correct the optical power value according to the code type information sent by the device at the sending end.

In the present invention, by acquiring code type information in an optical signal of a communication system under measurement, a measured optical power value is corrected, thereby solving the problem in the prior art that the bending or aging failure of the optical fiber in the ODN cannot be identified through the measured optical power, and eliminating the influences on a measurement result caused by a change of distribution of the code type information in the optical signal. Thus, when the measured optical power in the present invention has a significant change, it can be determined that an abnormal event occurs on the ODN, so as to provide a more accurate input for network fault location.

DETAILED DESCRIPTION

The present invention mainly involves an optical signal in a PON, that is, a burst mode optical signal, which is, for example, represented by binary of a digital optical signal. Specifically, when an average optical power is measured, a distribution of code type information of an optical signal to be measured, that is, a distribution of "0" signals and/or "1" signals, is counted, the measured average optical power value is corrected, and a corrected optical power value is acquired, thereby eliminating the influence on the continuous fluctuations of a measured optical power caused by the change of the distribution of "0" signals and/or "1" signals in the optical signal, so as to further identify and determine failures on the ODN.

Figure 2:
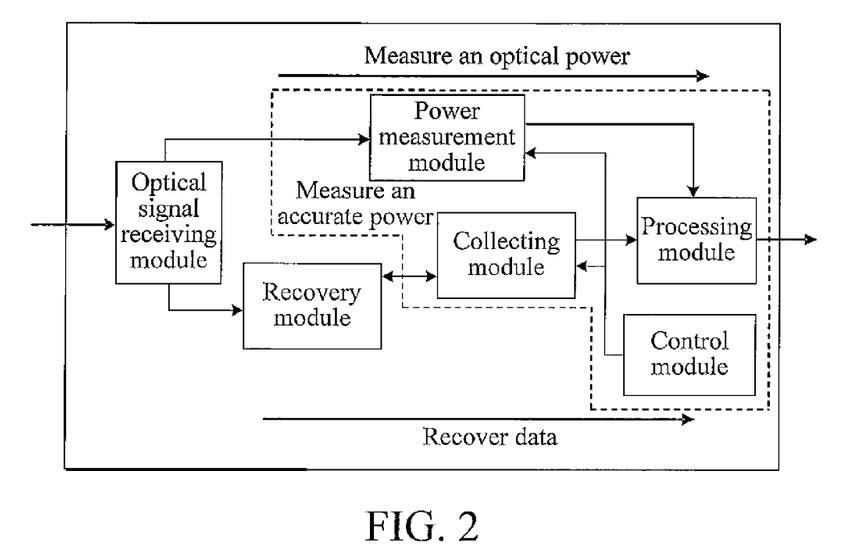
FIG. 2 is a diagram of a device for measuring an optical power according to an embodiment of the present invention.

As shown in FIG. 2, in an embodiment, the present invention provides a device for measuring an optical power, which includes a collecting module, a power measurement module, and a processing module. The collecting module is configured to collect code type information in an optical signal of a communication system, that is, collect code type information in an electrical signal converted from the optical signal. The power measurement module is configured to measure an optical power value of the corresponding optical signal of the communication system, that is, measure the electrical signal converted from the optical signal, so as to acquire the optical power value. The processing module is configured to correct the optical power value according to the code type information. The code type information includes a duty ratio of the optical signal and/or a distribution of "0" signals and "1" signals in the optical signal. The collecting module may be located in a device at a sending end, and/or located in a device at a receiving end.

The device for measuring the optical power further includes a control module, an optical signal receiving module, and a recovery module. The control module is configured to control the collecting module and the power measurement module, so that a collecting operation performed by the collecting module and a measuring operation performed by the power measurement module are performed on optical signals in the same time period, that is, the same optical signals. The optical signal receiving module is configured to receive an optical signal in a PON, convert the optical signal to an electrical signal, and send the electrical signal to the recovery module and the power measurement module. The recovery module is configured to recover data in the electrical signal according to the electrical signal output from the optical signal receiving module, so as to perform a normal service.

Figure 3:
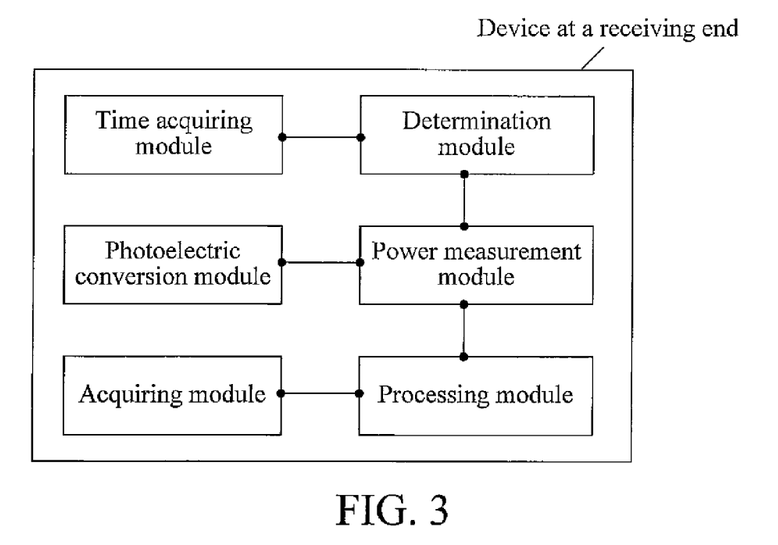
FIG. 3 is a structural view of a device at a receiving end according to an embodiment of the present invention.

When the collecting module is located in the device at the receiving end, as shown in FIG. 3, the device at the receiving end includes an acquiring module, a power measurement module, and a processing module. The acquiring module is configured to receive code type information from the device at the sending end, that is, receive the code type information acquired by the device at the sending end through collecting the optical signal. The power measurement module is configured to measure the optical power value of the corresponding optical signal of the communication system, that is, measure the electrical signal converted from the optical signal, so as to acquire the optical power value. The processing module is configured to correct the optical power value according to the code type information. The code type information includes a duty ratio of the optical signal and/or a distribution of "0" signals and "1" signals in the optical signal.

When sending data, the device at the sending end may perform a line encoding process, a churning process, or other processes on the data, and perform an electrical-to-optical conversion, and then send the data. Therefore, the device at the sending end acquires a duty ratio and/or a distribution of "0" signals and "1" signals in a signal to be sent before or after performing the line encoding process, the churning process, or other processes on the data, and sends the acquired information to the device at the receiving end. The uplink signal is in a burst mode, that is, the ONU sends uplink signals at intervals. Thus, when the acquired result is sent to the device at the receiving end, the following two situations exist. 1. The acquired result of the uplink signal in the burst mode of this time is placed at a tail end of the uplink signal in the burst mode of this time, so that the acquired result is transmitted to the receiving end in real time, and thus the power may be corrected in real time, thereby reducing the time required by a power measurement period (that is, a sum of measurement time and correction time required by acquiring the correct optical power value after power correction). 2. The acquired result of the uplink signal in the burst mode of this time is placed in an uplink signal in a burst mode sent at a certain subsequent time. This manner may be adopted when the real-time demand for the measurement of the power is not quite high. In the above manner, the acquired results of a plurality of previous uplink signals in the burst mode are gathered in the uplink signal in the burst mode sent at a certain time, so that the receiving end acquires a plurality of acquired results at one time. Thus, the receiving end may receive the results at intervals instead of receiving the result each time, thereby improving the efficiency of the system, and reducing the complexity of realizing the system. The acquiring module of the device at the receiving end receives the code type information (that is, the duty ratio and/or the distribution of "0" signals and "1" signals) from the device at the sending end.

In order to ensure that the collecting operation performed by the collecting module in the device at the sending end and the measuring operation performed by the power measurement module in the device at the receiving end are performed on the optical signals in the same time period, the device at the sending end needs to notify the device at the receiving end of a code type acquiring time point, in which the code type acquiring time point is the time point of starting to collect the code type information by the device at the sending end.

The device at the receiving end further includes a time acquiring module and a determining module. The time acquiring module is configured to acquire the code type acquiring time point sent by the device at the sending end, in which the code type acquiring time point is the time point of starting to collect the code type information by the device at the sending end. The determining module is configured to determine an optical signal to be measured by the power measurement module according to the code type acquiring time point and a signal transmission delay, in which the signal transmission delay is a transmission delay between the code type acquiring time point and a time point of sending the optical signal by the sending end plus a delay between a time point of sending the optical signal by the device at the sending end and a time point of receiving the optical signal by the device at the receiving end.

If the device at the sending end acquires the duty ratio and/or the distribution of "0" signals and "1" signals in the signal to be sent before performing the line encoding process, the churning process, or other processes on the data, the recovery module or the processing module in the device at the receiving end needs to perform a corresponding conversion on the code type information acquired by the acquiring module to acquire the converted code type information, and corrects the optical power value according to the converted code type information.

Detailed working processes of the modules in FIG. 2 are described as follows.

The optical signal receiving module receives the optical signal in the PON, converts the optical signal to the electrical signal, and outputs the electrical signal. The electrical signal in one path is input to the recovery module, and the recovery module recovers the data in the signal according to a frame structure of the PON, so that the service can run normally. The electrical signal in the other path is input to the power measurement module for measuring the power.

The power measurement module samples, amplifies, filters, and performs an analogue to digital conversion on the signal, and then acquires an average optical power value.

The collecting module scans the data recovered by the recovery module, and collects a duty ratio of the optical signal to be measured and/or a distribution of "0" signals and "1" signals in the optical signal. The collecting module may be realized through a hardware circuit, or through a software module. The collecting module may be located in the sending end, so that the device at the sending end collects the code type information in the optical signal of the communication system. Alternatively, the collecting module may be located at the receiving end, so that the device at the receiving end collects the code type information in the optical signal of the communication system.

The control module synchronously controls the collecting module and the power measurement module, so as to ensure that the operation of collecting data by the collecting module and the operation of measuring the average optical power by the power measurement module are performed on optical signals in the same time period.

The processing module corrects the optical power value measured by the power measurement module according to the code type information collected by the collecting module, so as to acquire a corrected optical power value. When sending data, if the device at the sending end performs the line encoding process, the churning process, or other processes on the data, and performs the electrical-to-optical conversion, and then sends the data, the electrical signal derived after a conversion performed by the optical signal receiving module is a signal after being encoded or churned, so that the recovery module needs to decode or dechurn the received signal. The collecting module may collect the code type information of the signal before being decoded or dechurned by the recovery module, or collect the code type information of the signal after being decoded or dechurned by the recovery module. In the embodiment of the present invention, the power measurement module measures the optical power value of the signal before being decoded or dechurned by the recovery module. Thus, if the collecting module collects the code type information of the signal before being decoded or dechurned, the processing module directly corrects the measured optical power value according to the code type information, and if the collecting module collects the code type information of the signal after being decoded or dechurned by the recovery module, the collecting module and/or the processing module needs to perform a corresponding conversion on the code type information to acquire the converted code type information, and then the processing module corrects the measured optical power value according to the converted code type information.

Figure 4:
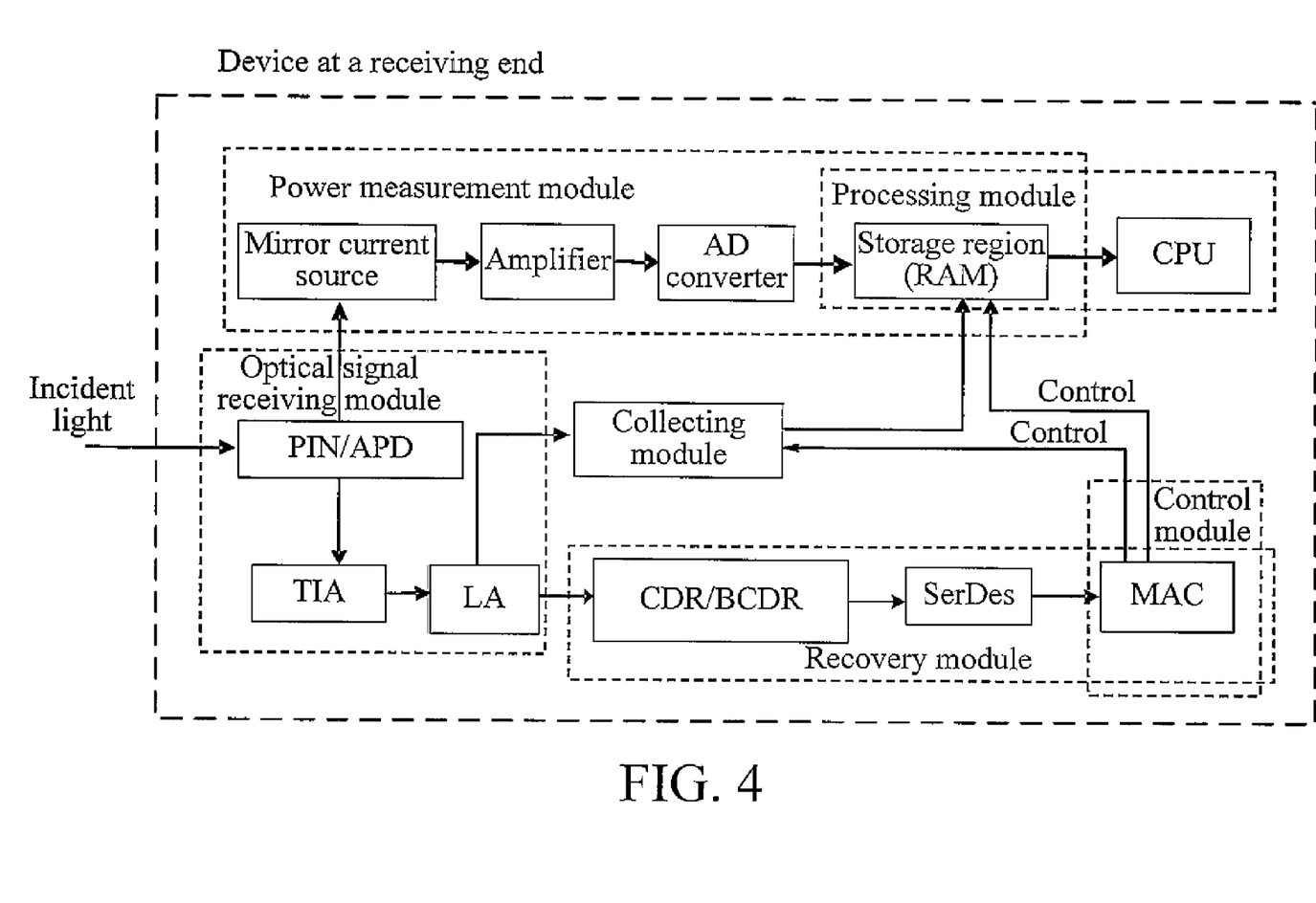
FIG. 4 is a schematic view of a first method according to an embodiment of the present invention.

Referring to FIG. 4, a method for measuring an optical power according to the present invention is described in detail.

Referring to FIG. 4, the functions of the optical signal receiving module include converting an optical signal to an electrical signal, amplifying an electrical signal, as well as other functions. Specifically, in the optical signal receiving module, the function of converting an optical signal to an electrical signal may be completed by a positive intrinsic negative (PIN) and an avalanche photodiode (APD), and the function of amplifying an electrical signal may be completed by a trans-impedance amplifier (TIA) and/or a limiting amplifier (LA).

The recovery module may be formed by a clock and data recovery (CDR) or a burst clock and data recovery (BCDR), serializer/deserializer (SerDes), and a media access control (MAC). The CDR or BCDR performs data and clock recovery on the electrical signal amplified by the optical signal receiving module. Then, the SerDes performs a series-parallel conversion on the electrical signal, and sends the electrical signal to the MAC for performing a PON physical layer frame protocol process, so as to perform the normal service.

The power measurement module may be formed by a current sampler (for example, a mirror current source), an amplifier, an analogue to digital converter (AD converter), and a storage region (for example, a random access memory (RAM)). The current sampler samples the electrical signal output from the PIN or the APD, so as to acquire a current signal indicating the power of the input optical signal, thereby acquiring a mirror electrical signal. Then, the mirror electrical signal is sent to the amplifier and the AD converter for being amplified, conditioned (for example, filtered), and sampled, so that the data indicating the power of the input optical signal is acquired, and stored in the storage region (for example, RAM) under the control of the control module.

The collecting module completes counting the code type information in the input optical signal, that is, if the device at the receiving end counts the code type information, the receiving end counts the electrical signal converted from the optical signal, so as to acquire the code type information in the optical signal; if the device at the sending end counts the code type information, the device at the sending end preferably completes counting the code type information before the electrical-to-optical conversion, that is, acquires and counts the code type information in the signal to be sent before or after performing the line encoding process, the churning process, or other processes on the data, thereby acquiring the duty ratio and/or the distribution of "0" signals and "1" signals. Of course, an independent module having a photoelectrical detection function and a code type information counting function may also be adopted, but the former mode has a lower cost and a lower complexity than the latter one. The counting function may be realized by the software or the hardware. For example, the code type information may be collected by using one comparer and two counters. A threshold level is set in the comparer, and when the electrical signal input from the LA is lower than the threshold level, a counter 1 is triggered to count a clock signal. When the electrical signal input from the LA is higher than the threshold level, a counter 2 is triggered to count a clock signal. The clock signal may be equal to or higher than a data signal frequency. The code type information may be acquired according to results of the counter 1 and the counter 2, and the code type information is stored in the corresponding storage region (for example, RAM) under the control of the control module. The code type information may be a ratio or distribution of "0" signals and "1" signals in the optical signal, and a duty ratio of the signal.

The control module may be realized in the MAC. The control module performs synchronization control on the power measurement module and the collecting module, and particularly controls the measuring operation performed by the power measurement module and the collecting operation performed by the collecting module to be performed on optical signals in the same time period. For example, after receiving a burst signal, the MAC starts the power measurement module and the collecting module at the same time at a certain time point t1, then stops the power measurement module and the collecting module at another certain time point t2, and controls the results of the power measurement module and the collecting module to be stored in the corresponding storage region (for example, RAM).

The processing module may be formed by a processor (for example, a CPU) and a storage region (for example, an RAM), in which the storage region may be an independent storage region, or the processing module may share the same storage region with the power measurement module. The processor periodically reads the optical power and the code type information stored in the storage region, and performs the processing and correction, thereby acquiring the optical power value that is not affected by the code type information, so as to complete measuring the optical power. When sending data, if the device at the sending end performs the line encoding process, the churning process, or other processes on the data, and performs the electrical-to-optical conversion, and then sends the data, the electrical signal derived after a conversion performed by the optical signal receiving module is a signal after being encoded or churned, so that the recovery module needs to decode or dechurn the received signal. The collecting module may collect the code type information of the signal before being decoded or dechurned by the recovery module, or collect the code type information of the signal after being decoded or dechurned by the recovery module. In the embodiment of the present invention, the power measurement module measures the optical power value of the signal before being decoded or dechurned by the recovery module. Thus, if the collecting module collects the code type information of the signal before being decoded or dechurned, the processing module directly corrects the measured optical power value according to the code type information, and if the collecting module collects the code type information of the signal after being decoded or dechurned by the recovery module, the collecting module and/or the processing module needs to perform a corresponding conversion on the code type information to acquire the converted code type information, and then the processing module corrects the measured optical power value according to the converted code type information.

The data processing manner in the processing module is, for example, described as follows.

$P_0$, a power of a "0" signal;

$P_1$, a power of a "1" signal;

$P_{avg\_i}$, an average optical power measured at the $i^{th}$ time;

$N_{0\_i}$, a number of "0" signals in the measured data at the $i^{th}$ time;

$N_{1\_i}$, a number of "1" signals in the measured data at the $i^{th}$ time;

$N_{0\_i}/(N_{0\_i}+N_{1\_i})$, a probability of "0" signals in the measured data at the $i^{th}$ time; and $N_{1\_i}/(N_{0\_i}+N_{1\_i})$, a probability of "1" signals in the measured data at the $i^{th}$ time.

According to the code type information, the measured optical power value, and an optical power value correcting relational expression, the collected code type information and the measured optical power value are substituted in the relational expression, so as to acquire a corrected optical power value. Various relational expressions may be adopted, and one of the relational expressions is, for example, shown as follows. According to the measured average optical power and the probabilities of "0" signals and "1" signals, the following expression is obtained:

$$\begin{cases} (P_0 * N_{0\_1} + P_1 * N_{1\_1})/(N_{0\_1} + N_{1\_1}) = P_{avg\_1} \\ (P_0 * N_{0\_2} + P_1 * N_{1\_2})/(N_{0\_2} + N_{1\_2}) = P_{avg\_2} \\ \ldots \\ (P_0 * N_{0\_n} + P_1 * N_{1\_n})/(N_{0\_n} + N_{1\_n}) = P_{avg\_n} \end{cases}$$

in which, $N_{0\_i}$, $N_{1\_i}$, and $P_{avg\_i}$ are known, $P_0$ and $P_1$ are unknown, $i=1, 2, \ldots, n$, and n is the total measurement times.

In this manner, by using any two equations, a group of $P_0$ and $P_1$ is acquired.

In addition, by taking any two equations as a group, a group of $P_0$ and $P_1$ is respectively acquired, and then the average values are calculated from all the acquired $P_0$ and $P_1$, so as to acquire more accurate $P_0$ and $P_1$.

The above equation set may be calculated by using a least squares method or other methods, so as to acquire the values of $P_0$ and $P_1$.

After processing the average optical power value, the processing module directly outputs the power of "0" signals or the power of "1" signals. Meanwhile, in consideration of the using habit of the subscriber, an average value of the acquired $P_0$ and $P_1$ may also be calculated, that is, $P_{avg}=(P_0+P_1)/2$, thereby correcting the measured average power.

A group of data is corrected according to the above method, and the effects before and after the correction process are compared, and it is assumed that the data acquired by the processing module is:

| Measured Average Optical Power Value (mW) | Number of "0" Signals | Number of "1" Signals |
| --- | --- | --- |
| 6 | 4 | 6 |
| 7 | 3 | 7 |
| 5 | 5 | 5 |
| 7 | 3 | 7 |
| 2 | 8 | 2 |
| 5 | 5 | 5 |

By adopting the above method, the data in the above table is substituted into the equation set to calculate powers of the "0" signals and the "1" signals, thereby acquiring the results as follows.

| Measured Average Optical Power Value (mW) | Number of "0" Signals | Number of "1" Signals | Power of "0" Signals (mW) | Power of "1" Signals (mW) |
| --- | --- | --- | --- | --- |
| 6 | 4 | 6 | 0 | 10 |
| 7 | 3 | 7 | | |
| 5 | 5 | 5 | 0 | 10 |
| 7 | 3 | 7 | | |
| 2 | 8 | 2 | 0 | 10 |
| 5 | 5 | 5 | | |

Finally, it is acquired that the corrected optical power value is $(0+10)/2=5$ mW. Before the process of the above method is performed, the distributions of "0" signals and "1" signals are different, the measured average optical power has a significant change. At this time, if an abnormal event occurs on the ODN to result in the lowering of the optical power, the method in the prior art cannot determine whether the lowering of the optical power is caused by the change of the distributions of "0" signals and "1" signals, or caused by an abnormal event on the ODN. After the process of the above method, the measured power of the "0" signals, the measured power of the "1" signals, and the measured average optical power are maintained at relatively constant values, so that the finally output power value is not greatly influenced by the distributions of "0" signals and "1" signals. If the change of the measured power value exceeds a predetermined range, it can be easily identified that an abnormal event occurs on the ODN.

When the optical signals represented by other scales are adopted, the number of the unknowns is no longer two, that is, $P_0$ and $P_1$. Instead, the average optical power value and distributions of information symbols need to be measured for several times, and a plurality of equations is acquired by using the same method, so as to acquire a corrected optical power value. The principle is the same as the situation when the signal is represented by binary, so it is not described here.

Figure 5:
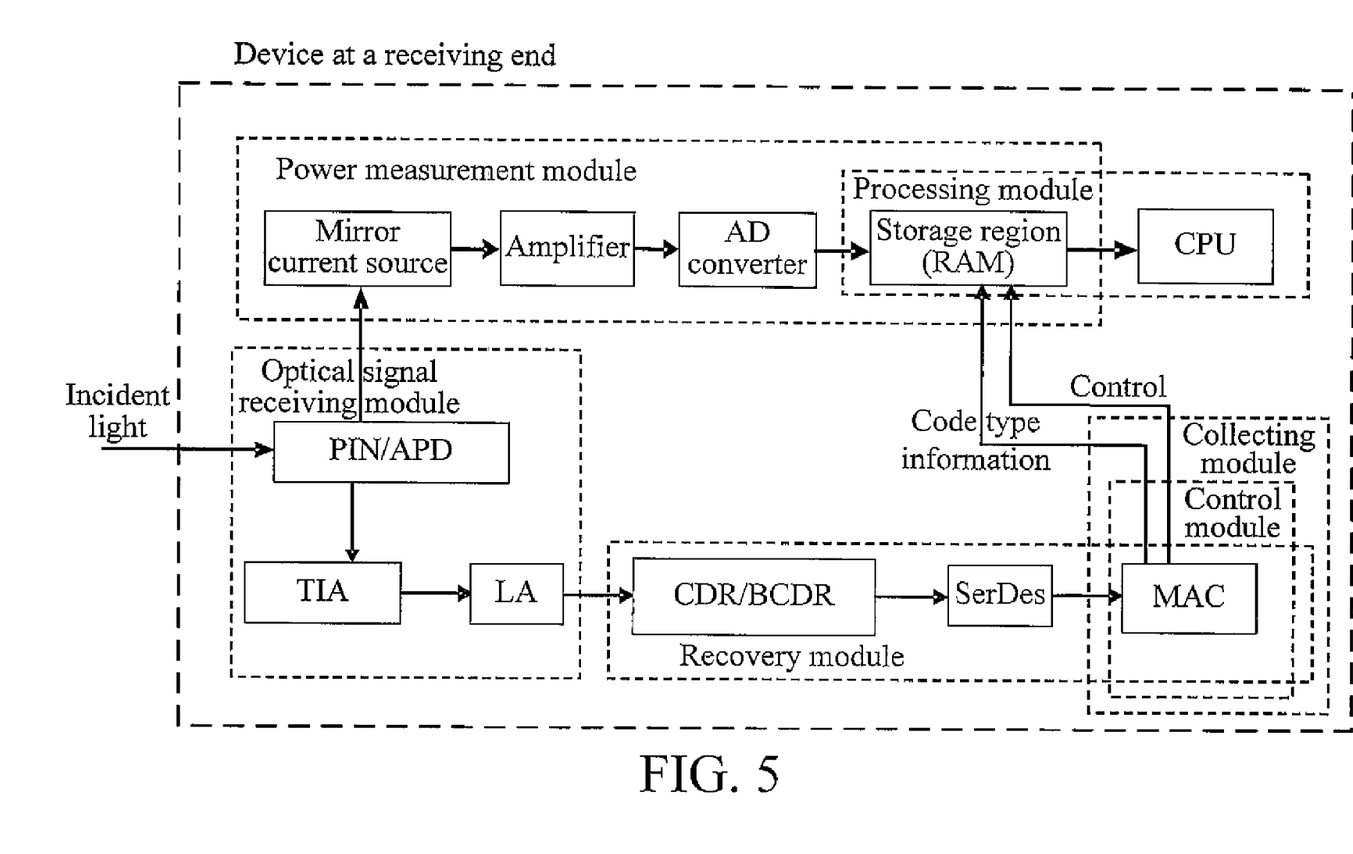
FIG. 5 is a schematic view of a second method according to an embodiment of the present invention.

Referring to FIG. 5, another method for measuring an optical power according to the present invention is described in detail.

As shown in FIG. 5, the structure of the device for measuring the optical power is the same as the structure of FIG. 3, which includes a collecting module, a power measurement module, and a processing module. The collecting module is configured to collect code type information in an optical signal of a communication system, that is, collect code type information in an electrical signal converted from the optical signal. The power measurement module is configured to measure an optical power value of the corresponding optical signal of the communication system, that is, measure the electrical signal converted from the optical signal, so as to acquire the optical power value. The processing module is configured to correct the optical power value according to the code type information. The code type information includes a duty ratio of the optical signal and/or a distribution of "0" signals and "1" signals in the optical signal. The collecting module may be located in a device at a sending end and/or located in a device at a receiving end. The device for measuring the optical power further includes a control module, an optical signal receiving module, and a recovery module. The control module is configured to control the collecting module and the power measurement module, so that a collecting operation performed by the collecting module and a measuring operation performed by the power measurement module are performed on optical signals in the same time period, that is, the same optical signals. The optical signal receiving module is configured to receive an optical signal in a PON, convert the optical signal to an electrical signal, and send the electrical signal to the recovery module and the power measurement module. The recovery module is configured to recover data in the electrical signal according to the electrical signal output from the optical signal receiving module, so as to perform a normal service.

The method for measuring the optical power performed by the functional modules in FIG. 5 is the same as that of FIG. 4, so that the specific method for measuring the optical power is not repeated. Here, the differences with the method for measuring the optical power in FIG. 4 are described as follows.

The collecting module may also be realized in the MAC. Each time when the recovery module recovers one data bit, the collecting module counts the data, acquires code type information, and stores the code type information in a corresponding storage region (for example, an RAM) under a control of the control module.

The collecting module may also be realized in other devices, for example, a device at a sending end. When sending data, the device at the sending end counts the code type information of the sent data, and sends the code type information to a device at a receiving end. The device at the receiving end recovers the code type information through the recovery module and stores the code type information in the corresponding storage region. Furthermore, the method for measuring the optical power may be further configured to measure an optical power of the sent optical signal. Similarly, the device for measuring the optical power may be the device at the sending end.

Another method for measuring the optical power according to the present invention is described in detail as follows.

A1. The device at the sending end collects code type information in an optical signal of a communication system, sends the code type information and the optical signal to the device at the receiving end, and sends a code type acquiring time point of the optical signal to the device at the receiving end. Considering the manner of collecting the code type information in the optical signal of the communication system by the device at the sending end, preferably, the device at the sending end acquires and counts the code type information in the signal to be sent, that is, counts the duty ratio and/or the distribution of "0" signals and "1" signals, before or after performing a line encoding process, a churning process, or other processes on the data. Of course, an independent module having a photoelectrical detection function and a code type information counting function may also be adopted, but the former mode has a lower cost and a lower complexity than the latter one.

A2. The device at the receiving end receives the optical signal, the code type information, and the code type acquiring time point of the optical signal, determines an optical signal to be measured according to the code type acquiring time point and a signal transmission delay, measures the optical signal to acquire an optical power value, and corrects the optical power value according to the code type information.

If the device at the sending end acquires the duty ratio and/or the distribution of "0" signals and "1" signals in the signal to be sent, that is, the code type information, after performing the line encoding process, the churning process, or other processes on the data, the device at the receiving end needs to perform a corresponding conversion on the received code type information to acquire converted code type information, and corrects the optical power value according to the converted code type information. In this case, the process that the device at the receiving end performs the corresponding conversion on the received code type information to acquire the converted code type information may be realized by the recovery module or the processing module, so that the implementation of the present invention is not affected.

It is understandable to those skilled in the art that the units in the modules in the embodiments of the present invention may be distributed in the modules in the way described herein, or distributed in other ways, for example, in one or more other modules. The units in the foregoing embodiments may be combined into one, or split into several subunits.

The above descriptions are merely some exemplary embodiments of the present invention, but not intended to limit the scope of the present invention. Any modification or replacement that can be easily made without departing from the spirit and principle of the present invention should fall within the scope of the present invention. Therefore, the protection scope of the present invention is subject to the appended claims.

What is claimed is:

1. A method for measuring an optical power, comprising:
   acquiring code type information in an optical signal of a communication system, wherein the optical signal comprises an optical signal of burst emission and/or an optical signal of burst reception;
   measuring the optical signal of the communication system, and acquiring an optical power value of the optical signal; and
   correcting the optical power value according to the code type information;
   wherein the acquiring the code type information in the optical signal of the communication system further comprises:
      recovering, by a receiving-end device, data from an electrical signal derived from a photoelectric conversion on the optical signal, and
      scanning, by the receiving-end device, the recovered data to collect a duty ratio of the optical signal or a distribution of "0" signals and "1" signals in the optical signal;
   wherein the code type information is collected by using a comparer, a first counter and a second counter; and
   wherein when the electrical signal input to the comparer is lower than a preset threshold level, the first counter is triggered to count a clock signal equal to or greater than a data signal frequency; when the electrical signal input to the comparer is higher than the preset threshold level, the second counter is triggered to count the clock signal, wherein the code type information is acquired according to results of the first counter and the second counter.

2. The method for measuring an optical power according to claim 1, further comprising:
   synchronizing an operation of collecting the code type information in the optical signal with an operation of measuring the optical power value of the optical signal, so that the operation of collecting the code type information and the operation of measuring the optical power value are performed on optical signals in the same time period.

3. The method for measuring an optical power according to claim 2, wherein the synchronizing the operation of collecting the code type information in the optical signal with the operation of measuring the optical power value of the optical signal further comprises:
   acquiring a code type acquiring time point from the device at the sending end, wherein the code type acquiring time point is a time point of starting to collect the code type information by the device at the sending end; and
   determining an optical signal to be measured according to the code type acquiring time point and a signal transmission delay.

4. The method for measuring an optical power according to claim 1, wherein the correcting the optical power value according to the code type information comprises:
   performing, by a receiving end device, correction on the optical power value on the optical power value by using a following expression:

$$\begin{cases} (P_0 * N_{0\_1} + P_1 * N_{1\_1})/(N_{0\_1} + N_{1\_1}) = P_{avg\_1} \\ (P_0 * N_{0\_2} + P_1 * N_{1\_2})/(N_{0\_2} + N_{1\_2}) = P_{avg\_2} \\ \ldots \\ (P_0 * N_{0\_n} + P_1 * N_{1\_n})/(N_{0\_n} + N_{1\_n}) = P_{avg\_n} \end{cases};$$

where in $P_0$, $P_1$, $P_{avg\_i}$, $N_{0\_i}$ and $N_{1\_i}$ respectively present a power of a "0" signal, a power of a "1" signal, an average optical power at an ith time measurement, a number of "0" signals at the ith time measurement, and a number of "1" signals at the ith time measurement.

* * * * *